United States Patent

Odnolko et al.

[15] 3,688,026

[45] Aug. 29, 1972

[54] METHOD AND SYSTEM FOR THE DOT-PATTERN RECORDING OF HALF-TONE IMAGES

[72] Inventors: Valentin Vladimirovich Odnolko, Vladimir Aronovich Uzilevsky, both of Leningrad, U.S.S.R.

[73] Assignee: Leningradsky elektrotekhnichesky Institut Svyazi imeni Professora M. A. Bonch-Bruevicha, U.S.S.R., Leningrad Maika

[22] Filed: Oct. 29, 1970

[21] Appl. No.: 85,179

Related U.S. Application Data

[63] Continuation-in-part of Ser. No. 74,524, Sept. 22, 1970, abandoned, which is a continuation-in-part of Ser. No. 750,535, Aug. 6, 1968, abandoned.

[52] U.S. Cl. ..................178/6.7, 315/16, 346/74 CR

[51] Int. Cl. ..............................................H03n 1/24

[58] Field of Search.......178/6.7; 315/16; 346/74 CR

[56] References Cited

UNITED STATES PATENTS

| | | | |
|---|---|---|---|
| 3,463,880 | 8/1969 | Corson | 178/6.7 |
| 3,441,786 | 4/1969 | Clayton | 315/16 |
| 2,160,672 | 5/1939 | Ploke | 315/16 |

*Primary Examiner*—J. Russell Goudeau
*Attorney*—Holman & Stern

[57] ABSTRACT

A method for half-tone dot reproduction of continuous-tone images transmitted by facsimile or television, wherein use is made of a CRT having a focusing lens with three consecutive electrodes. The inner electrode accepts a video-signal voltage sufficient for the electron beam to be diaphragmed. As a result, the light spot appearing on the CRT screen varies in area from a finite size to zero. The method disclosed herein serves as the basis for an apparatus comprising a dot-frequency generator connected to a modulating electrode of a CRT, a power supply source connected to the outer electrodes of a focusing lens so that they are at a potential exceeding that at the cathode of the CRT. In this apparatus referred to, a video amplifier is connected to the inner electrode of the three-electrode focusing lens of the CRT. The aperture in the inner electrode should be equal to the cross-section of the electron beam.

5 Claims, 7 Drawing Figures

METHOD AND SYSTEM FOR THE DOT-PATTERN RECORDING OF HALF-TONE IMAGES

This application is a continuation-in-part of application Ser. No. 74,524 now abandoned, which is a continuation of application Ser. No. 750,535 filed Aug. 6, 1968 now abandoned.

The present invention relates to methods and apparatus for the reproduction of black-and-white and color images, especially drawings, printed matter, photographs and newspaper illustrations, in facsimile and television.

The methods that were known until quite recently for the reproduction of color and black-and-white continuoustone images with the aid of facsimile apparatus could not ensure the correct rendition of half-tones. The quality of reproduction was to a great extent dependent on the characteristics and subsequent processing of the photographic materials used. Besides, the complexity of these known methods stood in the way of automation in reproduction.

A substantial decrease in these disadvantages became possible with the advent of electrical reproducing apparatus utilizing cathode-ray tubes (CRTs) and capable of reproducing an image in the half-tone dot form. In such apparatus, the electric signals carrying information about the optical density of the subject-copy control the area of a constantbrightness synthesizing aperture and not the brightness of the light spot on the CRT. In other words, the signals control the size of the light spot formed on a CRT.

The projection of light spots onto a photographic material jointly with the electronic or electromechanical scanning of the image produces a half-tone dot image of the continuous-tone subject copy.

According to the principle underlying the formation of a light spot, that is, an image of a dot element, all existing systems may be divided into two classes.

In the first class of apparatus, the video signal controls the cross-sectional area of the electron beam in the plane of the CRT screen. Among other things, this control of the cross-sectional area of a dot-pattern element can be obtained as, for example, it is disclosed in U.S. Pat. No. 3,463,880, to Corson, by varying the focal distance of the electron beam in accordance with the video signal. However, this method of forming a dot-pattern element does not ensure the requisite sharpness of the dot edges, a fact due in this case to a Gaussian distribution of the electron density across the electron beam of the CRT. Because of this, designers turned to the second class of apparatus in which a dot-pattern element is formed by the video-signal controlled scanning motion of the electron beam across the CRT screen, for example, by the spiral scanning as described by Corson in the above mentioned U.S. Pat. No. 3,463,880, although this class of apparatus is rather complex and unwieldy.

However, such apparatus, notably the apparatus using the spiral scan for the pattern-forming dot, does not produce half-tone dot photographic forms suitable for use without additional duplicate negatives prepared to enhance the sharpness of the dot edges (see, for example, IEEE Spectrum, October, 1968, p.66).

It is an object of this invention to provide a method for the reproduction of images which simplifies the design of receiving apparatus, ensures its stability and reliability, and makes the quality of color synthesis independent of the form and compatibility of the apparatus and light-sensitive material used.

It is another object of the present invention to provide an apparatus which produces a high-quality image suitable for immediate viewing or typographic printing and which is simple and reliable in operation.

These and other objects are attained by the fact that in the half-tone dot reproduction of continuous-tone images transmitted by facsimile or television with the use of a CRT having a three-electrode focusing lens, a variable-area light spot is produced on the CRT screen, for which purpose according to the invention the inner electrode of said lens accepts a video-signal voltage such that the electron beam of the CRT is diaphragmed by the electric field of the lens, while the outer electrodes of the lens are held at a potential higher than that of the CRT cathode. In the course of reproduction the CRT is alternately made conducting and non-conducting by application of rectangular pulses following at a rate such that for each pulse there is a dot or a line of the pattern.

In the realization of the method disclosed herein it is preferable that the inner electrode of said lens should accept a video signal in negative polarity relative to the cathode of the same CRT.

An apparatus for the realization of the method disclosed herein comprises a CRT with a three-electrode focusing lens, a dot-frequency oscillator generating rectangular pulses and connected to the modulating electrode of said CRT to chop its electron beam, a power supply connected to the outer electrodes of said three-electrode focusing lens and furnishing a voltage exceeding the potential at the cathode of said CRT, a video-amplifier connected to the inner electrode of said lens and producing a video-signal voltage such that the electron beam of said CRT is diaphragmed by said lens.

In order to improve the quality of reproduction, it is preferable that the aperture of the inner electrode of the lens should be substantially close in size to the cross-section of the electron beam and that the video amplifier should furnish signals in negative polarity relative to the cathode of said CRT.

To obtain images with a non-periodic half-tone dot structure preventing spurious moire patterns in multicolor printing, the apparatus disclosed herein should preferably incorporate a non-periodic signal generator connected to to the deflection system of the CRT.

The invention will be best understood from the following description of a preferred embodiment when read in connection with the accompanying drawings, wherein.

FIGS. *3a* – *3e* illustrate an arrangement forming an image of a dot element in the CRT wherein FIGS. *3a*, *3b* relate to prior art, and FIGS. *3c*–*3e* relate to the present invention.

Figures 1, 2:
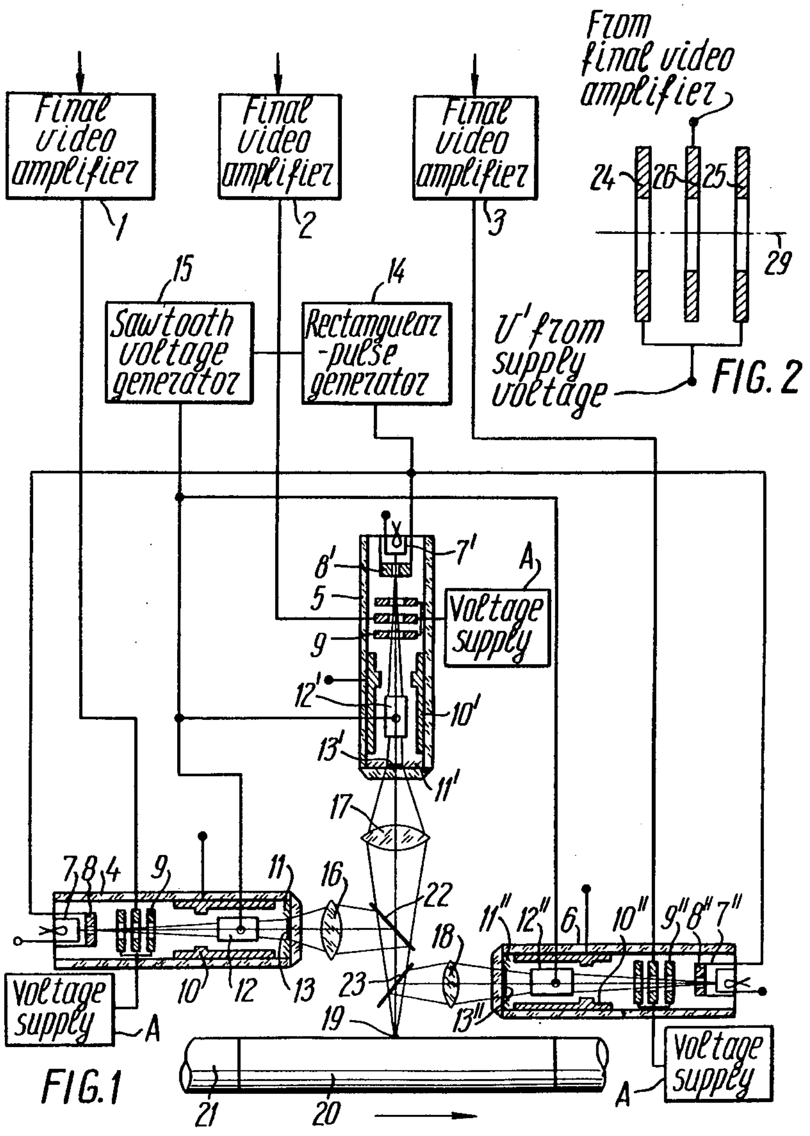
FIG. 1 is a block-diagram of a three-CRT apparatus for the half-tone dot reproduction of a color image.
FIG. 2 shows a three-electrode focusing lens.
Figures 3A, 3B, 3C, 3D, 3E:
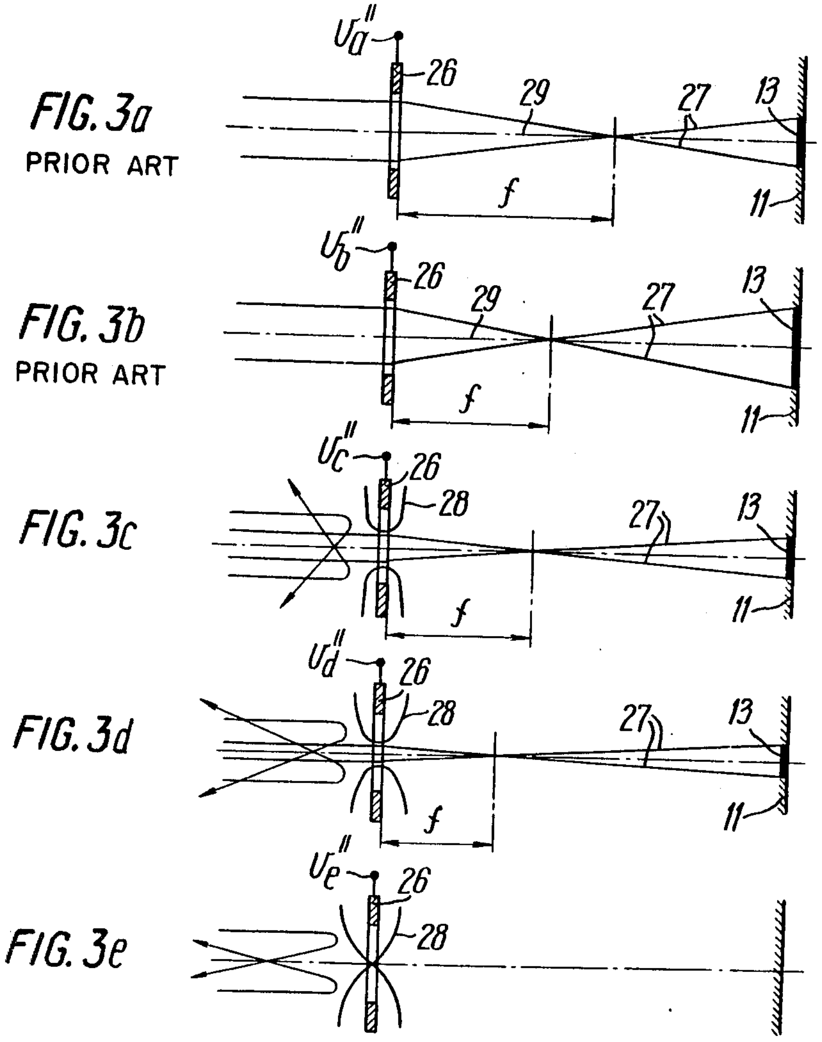
FIG. 3a PRIOR ART, FIG. 3b PRIOR ART, FIG. 3c, FIG. 3d, FIG. 3e

Referring to FIG. 1, there is an apparatus for the half-tone dot reproduction of continuous-tone images, which comprises the following components and assemblies:

a. final (split-color) amplifiers 1, 2, and 3, each of which accepts a split-color signal. The apparatus disclosed herein provides for the reproduction of three split-color signals, which fact ensures good color rendition, but this number may be increased or decreased, according to the requirements for the quality of rendition;

b. light modulators in the form of CRTs 4, 5, and 6, each of which has a filamentary cathode 7, 7' and 7'', a modulating electrode 8, 8', and 8'', a focusing lens 9, 9', and 9'', an accelerating electrode (anode) 10, 10', and 10'', a phosphor screen 11, 11', and 11'', and deflection plates 12, 12', and 12''. The electron beam produced in each CRT 4, 5, and 6 is directed upon the phosphor screen 11, 11' and 11'' where it produces a stationary light spot 13, 13', and 13''. Modulation consists in varying the diameter of the light spot according to the voltage of the split-color signal;

c. a rectangular-pulse generator 14;

d. a saw-tooth voltage generator 15 connected to the deflection plates 12 of the CRTs 4, 5 and 6 and synchronized by the rectangular-pulse generator 14. In this way, the light spots can periodically be swept across the screens 11, 11' and 11'' in the direction of the line scan, thereby making up for the pulling of the dot elements. The rise time of the saw-tooth pulses is selected to be equal to the exposure time of a dot element. It should be noted that the deflection plates can be used to shift the light spots on the CRT screens as the phosphor ages. The lenses 16, 17, and 18 provided in front of the screens 11, 11' and 11'' of the CRTs 4, 5 and 6 respectively project the light spots from the CRTs 4, 5 and 6 to form a dot element 19 on the color photographic material wrapped around a cylinder 21 which rapidly rotates on its axis and slowly moves cross-wise for image-scanning in step with the drum in the transmitting scanner (not shown in the drawing) carrying the subject copy.

Before describing the apparatus disclosed herein as a whole, consider the principle underlying the formation of a luminous spot on a CRT by reference to the focusing lens 9 of the CRT 4. The lenses of the other CRTs are identical and are marked 9' and 9''. In the example chosen, the lens is of single-element design, as shown in FIG. 2. The lens incorporates three diaphragms 24, 25 and 26 arranged at right angles to the longitudinal axis 29 of the electron beam. The outer diaphragms 24 and 25 are electrically interconnected and are held at a potential V' exceeding that of the CRT cathode for which purposes there is a d.c. source A connected to the lens. The other lenses have d.c. sources A' and A'' connected to them.

The middle diaphragm 26 is connected to the final video amplifier 1 which furnishes a video signal such that the electron beam is diaphragmed by the electric field of the lens over the entire amplitude range of the video signal.

For better diaphragming of the electron beam, two conditions are critical. First, the aperture of each electrode in the lens should be close in size to the cross-section of the electron beam on the cathode side. Second, the video signal applied to the inner electrode should be in negative polarity with respect to the cathode always.

Operation of a three-electrode focusing lens will be more fully understood from reference to FIGS. *3a*, *3b*, *c*, *d*, and *3e*. FIGS. *3a* and *3b* explain the formation of a variable-area light spot on a CRT by varying the focal distance of the beam, while FIGS. *3c*, *3d* and *3e* show the formation of a light-spot through diaphragming the electron beam by the electric field of the lens.

While the outer electrodes (not shown in FIGS. *3a*–*3e'* exceeding that of the cathode, let the potential V'' of the inner electrode 26 decrease monotonically from a certain potential $V_a''$ lower than V' but higher than the cathode potential (FIG.*3a*) to $V_e''$, lower than the cathode potential (FIG. *3e*).

As the potential of the inner electrode 26 is decreased from $V_a''$ to $V_b''$, the power of the lens increases, the focal distance (*f*) decreases and, as is seen from the drawings, the light spot 13 on the screen 11 grows larger in area. Thus, the application of a video signal with a maximum amplitude $v_a''$ and a minimum amplitude $V_b''$ to the inner electrode will modulate the area of the dot element through the variation of the focal distance. Apart from lack of sharpness at the dot edges already mentioned before, this method does not make it possible to vary the area of the light spot gradually from a certain finite value to zero and cannot maintain the light spot at constant brightness over the entire range of area modulation.

The electric field of the lens begins to control the electron beam when the inner electrode comes by a potential $V_c''$, which is lower than V' and is close to the potential of the CRT cathode. As a result there is formed, near the inner electrode, an equipotential surface *2b* of zero potential, which approaches the axis 29 of the CRT upon further reduction of V'' (FIGS. *3c*, *3d* and *3e*).

This is accompanied by a reduction in the area of the light spot, although the reduction in V'' from $V_c''$ to $V_e''$ decreases the focal distance still more. As this happens, the peripheral electrons of the beam are reflected from the electric field of the lens, and the beam current on the screen decreases in proportion to the decrease in the size of the light spot 13. At a certain potential V'', which is lower than that of the cathode, the zero-potential surface 28 crosses the axis 29 of the CRT, and the beam is blocked. (FIG. *3e*).

Thus, when the inner electrode 26 accepts a video signal the maximum amplitude of which is equal or close to the cathode potential and the minimum amplitude of which is lower than the cathode potential, the area of the dot element is varied through the control of the electron beam by the electric field of the three-electrode focusing lens.

An apparatus for the reproduction of continuous-tone color images as a whole operates as follows.

Three independent split-color signals are applied to three final (split-color) amplifiers 1, 2, and 3. Let, as an example, the amplifier 1 accept a blue signal, the amplifier 2 a green signal, and the amplifier 3 a red signal. From the amplifiers, these signals go to the respective focusing lenses 9, 9' and 9'' in the CRTs 4, 5, and 6. The electron beams produced in the CRTs impinge each upon the respective phosphor screen 11, 11' and 11'', producing a luminous spot on them such that the brightness of the spots on the screens remains constant and their area varies according to the amplitude of the video signal, that is, according to the optical density of the subject copy. At the same time, the deflection plates 12, 12' and 12'' accept sawtooth voltage pulses from the generator 15 synchronized by the generator 14.

Modulated in size and keyed in time, the light spots are projected from the CRTs by the objective lenses 16, 17 and 18 with the required reduction onto an area of the color photographic material 20. The latter is a multilayer photographic paper or film mounted on a drum 21.

For color separation, in projecting the light spots from the screens 11, 11' and 11'' onto the photographic material 20 the light beams are made to pass through a system of optical color filters in the form of dichroic mirrors 22 and 23. The light beam from the CRT 4, modulated by the blue split-color signal, strikes the mirror 22 which reflects blue light and transmits all other colors. This blue light is free to pass through the mirror 23 and impinges upon the photographic material 20 where it forms a blue light spot. Also formed there is a red light spot, because the mirror 23 reflects the red light coming from the CRT 6 and transmits all other colors. The light beam produced on the screen 11' by the CRT 5, on passing through the mirrors 22 and 23, loses its red and blue components, so that a green light spot is formed on the photographic material 20 by this CRT. As a result, a scanning light spot is produced on the photographic material, composed as it were of three spots of primary (or complementary) colors, and of a size determined by the split-color signal voltages applied to the modulating electrodes of the CRTs 4, 5, and 6.

If, for example, the inputs of the amplifiers 1, 2, and 3 accept signals equal in magnitude, the resultant spots will also be of equal size. If only the CRT 4 accepts a signal, the photographic material will be exposed only to blue light and a blue image will be formed upon developing. The final color depends on the relative size of the color-separated spots.

Thus, when the three CRTs are simultaneously modulated, the photographic material is exposed to all colors produced by the three separated colors mixed in various proportions. The scanning motion of the light spot and the subsequent photo-chemical processing produce on the photographic material a color image having a half-tone dot pattern.

If, instead of a white phosphor for all the three CRTs, the CRT 4 uses a blue one, the CRT 5 a green one, and the CRT 6 a red one, color separation may be dispensed with, and the optical system will be simplified.

It should be noted that color synthesis may be subtractive or additive, according to whether the three synthesizing spots 13, 13' and 13'' merge into a single dot or arranged in juxtaposition on the photographic material 20. Furthermore, the maximum sizes of the dots on the reproducing photographic material correspond to the maximum optical densities of the subject copy. The larger the area of the dot elements (the smaller the separation between them), the higher the optical densities reproduced on the received copy. Conversely, the minimum optical densities of the subject copy correspond to the smallest dot elements (separated by large distances). Because of this, a continuous-tone color-picture reproduced on a photographic material will have a half-tone dot pattern resembling the pattern of typographical color prints.

In some cases, as in multi-color typographical printing, it is advisable to have a half-tone image with a nonperiodic dot pattern to prevent spurious moire patterns. For this purpose, the light spots 13, 13' and 13'' on the screens 11, 11' and 11'' should be shifted in a random manner at right angles to the scanning line. To accomplish this, the CRTs should have additional deflection plates (not shown in the drawings) at right angles to the plates 12, 12', and 12''.

A color facsimile apparatus performing half-tone dot synthesis can do black-and-white work. For this purpose, two of the three CRTs should be turned off, and a black-and-white photosensitive material should be placed on the receiving drum. Conversely, one of the CRTs (shown in FIG. 1) may be fitted into a black-and-white facsimile apparatus instead of the usual modulator.

The method disclosed herein offers a number of advantages: the distribution of brightness across the dot diameter has steep sides and ensures good sharpness of the dot element; the amplitude range of the video signal ensuring variations in the dot area from a maximum to zero does not exceed a few tens of volts; the dot area is linearly dependent on the applied voltage; the beam current density on the CRT within the modulation range of the dot area is close to constant.

A facsimile apparatus using the synthesizer disclosed herein offers the following advantages over existing ones for both color and black-and-white recording: it does not call for provision of complicated gamma-corrector for correct color and continuous-tone rendition; the continuoustone characteristic of synthesis is independent of that of the recording medium used and the characteristics of light modulators; the continuous tone characteristic of synthesis is linear over the entire range of optical densities; the service life of CRT modulators is much longer than that of exposure modulators in the form of gas-discharge lamps. The use of color phosphors may simplify the optical system of a color facsimile recorder and enhance its efficiency. Since phosphors may be made to have a much shorter afterglow than existing gas-discharge exposure modulators, the rate of facsimile transmission can also be materially increased.

What is claimed is:

1. A method for half-tone reproduction of continuous-tone images in facsimile and television, with the use of a CRT having a cathode, a modulating electrode, a three-electrode focusing lens formed by three consecutively arranged electrodes having co-axial apertures, and a light emitting face, comprising: applying a video signal in the form of a voltage to the middle electrode of said lens and; maintaining the outer electrodes of said lens at a potential higher than that of the CRT cathode, with the result applied to the middle electrode is varied; making the CRT alternately conducting by application of rectangular pulses to the modulating electrode following at such a rate that for each said pulse a dot of the half-tone dot pattern is formed; and projecting said variable-area light spot from the CRT face onto a photosensitive material.

2. A method, as claimed in claim 1, which comprises applying to the middle electrode a video-signal voltage which is negative relative to that of the CRT cathode.

3. An apparatus for the half-tone dot reproduction of continuous-tone images transmitted by facsimile or television, comprising:

a cathode-ray tube (CRT) with a three-electrode focusing lens, the electrodes of which are arranged one after another in the direction of the electron beam in said CRT and having coaxial apertures to pass an electron beam, two of the three electrodes being outer electrodes relative to the inner one;

a cathode a modulating electrode and deflection plates in said CRT;

a dot-frequency generator producing rectangular pulses and connected to the modulating electrode of said CRT to chop its electron beam;

a power supply source connected to the outer electrodes and furnishing a voltage higher than the potential at the cathode of said CRT;

a video amplifier connected to the inner electrode of said focusing lens and furnishing a video signal voltage with an amplitude such that said electron beam is diaphragmed by the electric field of said lens.

4. An apparatus, as claimed in claim 3, which includes a video amplifier furnishing a video signal voltage which is negative relative to the cathode of said CRT.

5. An apparatus, as claimed in claim 3 further comprising photographic material on which a video output from the CRT is directed, means for moving the photographic material relative to said CRT and a saw-tooth voltage generator operating at a frequency equal to that of the rectangular pulses, connected to the deflection plates of the CRT and synchronized by the dot-frequency generator.

* * * * *